July 31, 1956  B. O. ETLING  2,756,467

MULTIPLE-PANE GLAZING UNIT AND MANUFACTURE THEREOF

Filed Nov. 5, 1952

INVENTOR.
BIRTUS O. ETLING
BY
ATTORNEY

United States Patent Office 2,756,467
Patented July 31, 1956

2,756,467

MULTIPLE-PANE GLAZING UNIT AND MANUFACTURE THEREOF

Birtus Oliver Etling, Marshallville, Ohio

Application November 5, 1952, Serial No. 318,915

2 Claims. (Cl. 20—56.5)

This invention relates to a multiple-pane glazing unit and the method of manufacturing it. The unit may be used in a window or it may be used in a refrigerator or refrigerated show-case, etc.

The panes in the unit are spaced by a non-setting plastic composition such as uncured rubber. This spacer adheres to the panes and a tight seal is maintained with them by maintaining the space between the panes under a partial vacuum. The spacer does not harden or set, but remains plastic. It contains at least ten per cent by weight (based on the weight of the rubber) of petrolatum or the like which makes it moisture impervious. The panes may be of glass or transparent plastic. Around the edge of the unit over the spacer is a moisture-proof tape.

In manufacturing the unit the panes are first thoroughly cleaned. One pane is placed in a horizontal position, the strip of spacer material is placed on this pane around its edge and the other pane is then placed on the spacer, forming a pocket between the two panes, bonded by the spacer. The pocket is partially evacuated through a needle inserted through the spacer. As evacuation of the pocket progresses, dry gas is introduced into the pocket through the spacer at a location remote from where the vacuum connection is made. During the replacement of the air by a dry gas the pressure in the pocket between the panes is maintained somewhat below atmospheric in order to draw the panes tightly against opposite surfaces of the spacer and form a gas-tight bond between the spacer and each pane. If the pressure were allowed to become greater than atmospheric there would be a leakage of gas outwardly and the seal between the spacer and the panes would be broken. The air in the pocket is preferably replaced by nitrogen, but another gas, even dry air, may be used. The vacuum and dry gas connections are removed from the spacer while the pocket is under a partial vacuum and a moisture-proofing tape is placed around the edge of the unit to assist in keeping out all moisture.

Unless the gas in the pocket is kept dry the inner surfaces of the panes will fog when the temperature is lowered. Therefore, the spacer composition contains at least about ten per cent of petrolatum or its equivalent to prevent moisture entering the pocket by diffusion through the spacer. A preferred formula is:

| | Parts by weight |
|---|---|
| Pale crepe rubber | 100 |
| Zinc oxide | 10 |
| Whiting | 150 |
| Santovar A | 1 |
| Petrolatum | 10 |
| Staybelite resin | 5 |
| SRF black | 1 |

A very finely ground whiting was used. Clay or equivalent inert mineral filler may be used in its place. It gives the rubber body. At least as much filler as rubber will be employed. Santovar A is ditertiary amyl hydroquinone. It is an antioxidant. Other antioxidants may be used. Staybelite resin is a hydrogenated rosin and is used as a rubber tackifier. Other tackifiers may be used. The black is used merely for coloring. Any coloring compound may be employed.

This uncured rubber composition or its equivalent, after thorough mixing, is extruded into strip form. The surface of the strip is covered with soap to prevent it from sticking to things with which it comes in contact prior to use in the assembly of the glazing unit. Just prior to use the soap is removed as by wiping the strip with a cloth saturated with naphtha or other quickly volatile organic solvent. The solvent aids in making the surface of the strip tacky.

It is not essential that solvent be applied to the surface of the strip. Alternatively the strip may be heated to 100° F. or thereabout in an oven or the like just prior to use. The humidity in the oven will be kept low, at for instance a relative humidity of 25 to 30. The soap-covered strip may be heated in this manner prior to removal of the soap with solvent.

After the panes have been assembled with the spacer, and the air in the pocket has been replaced by a dry gas under a pressure less than atmospheric, a moisture-proof tape of plastic or metal foil is placed over the edge of the unit. Lead, tin, aluminum or vinyl foil, etc. may be used.

The invention will be further described in connection with the accompanying drawings, in which—

The invention is illustrated as applied to a two-pane glazing unit although three or more panes may be utilized with a spacer between each two panes.

The illustrated unit is composed of the panes 1 and 2, the spacer 3 and the tape 4.

In manufacturing the unit, the panes are thoroughly cleaned to remove all traces of grease, lint, etc. Various types of materials are available for this purpose. To illustrate how thoroughly the panes should be cleaned in order to obtain the most satisfactory results, one operation is described in detail: The glass is first scrubbed with a product called Goldite or Kandu. Then it is re-scrubbed and washed with three separate washes of soft water. It is then rinsed with distilled water. Afterwards it is dried with cheese cloth which is thoroughly washed and rinsed one or two times a day. The glass is then dried and polished with flannel cloths which also are washed and rinsed one or two times a day. The glass is then placed in a drying kiln which is heated electrically to 100° F. until it is thoroughly dry in order to remove all moisture from the glass before it is processed.

Figure 1:
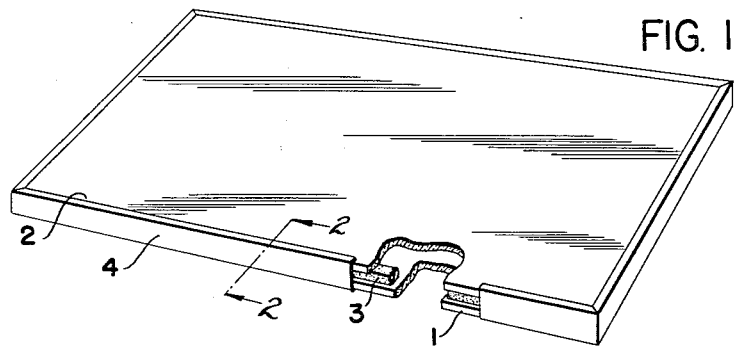
Fig. 1 is a view in perspective of a finished glazing unit, partially broken away.
Figure 2:
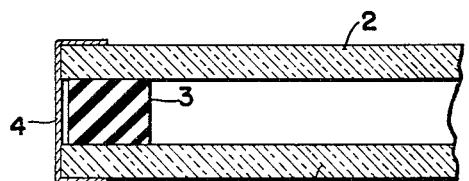
Fig. 2 is a section on the line 2—2 of Fig. 1.
Figure 3:
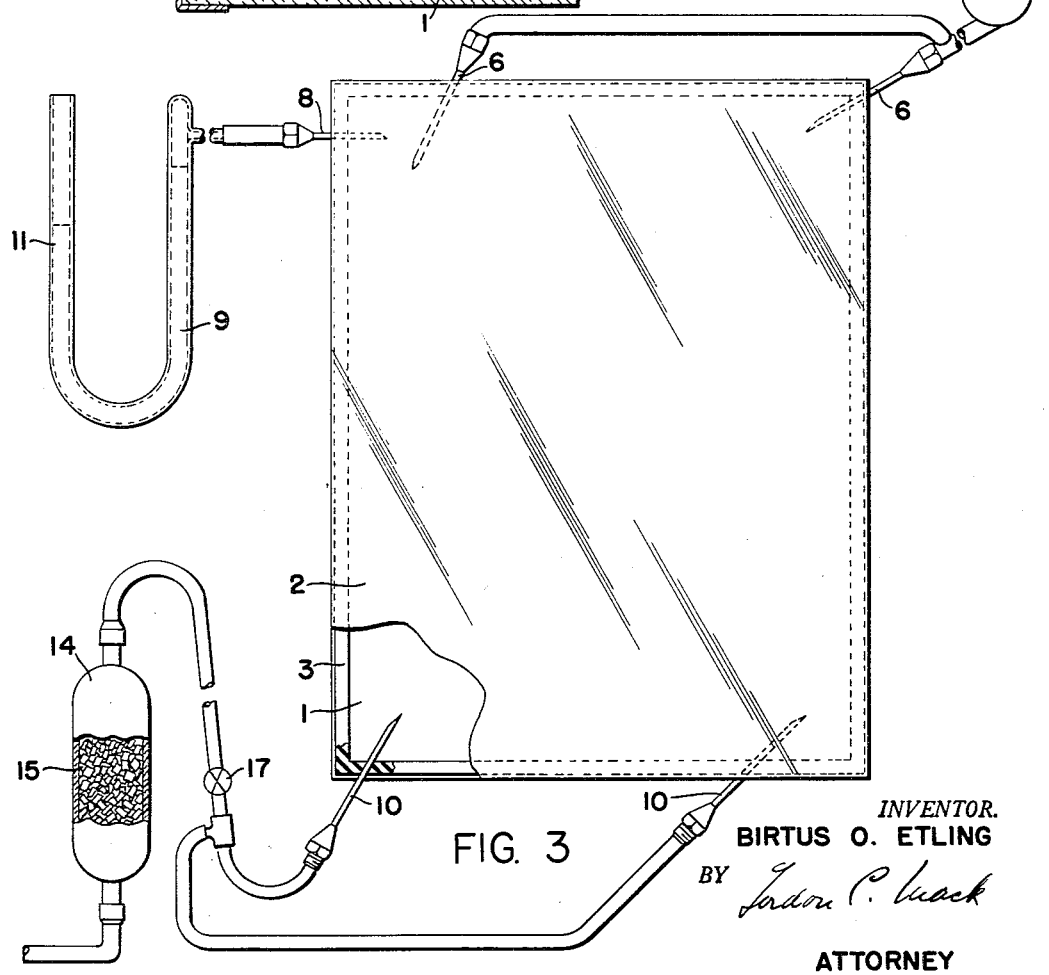
Fig. 3 illustrates the method of preparing the unit, a plan view of the glazing unit being shown, with equipment illustrated in elevation.

One of the panes which has been thoroughly cleaned and dried, as, for example, pane 1 of Fig. 3 is placed on a relatively flat surface. The spacer 3 is placed on the upper face of this pane near its edge. Then the other pane 2 which has been similarly cleaned and dried, is placed gently on the spacer. Then, while the panes remain dry, sufficient pressure is applied to flatten the upper and lower surfaces of the spacer against the panes so that the seals are formed with relatively wide surfaces of the spacer, and thus the possibility of gas leaking between the spacer and either of the panes is minimized.

Next the air pocket between the panes is partially evacuated. This is done with ordinary hypodermic needles 6 connected by suitable tubing to the vacuum pump 7. The needles are pressed through the spacer at one end of the pane, as illustrated in Fig. 3. In order to gauge the pressure in the air pocket a needle 8 connected by tubing to the manometer 9 is inserted through the spacer. For introducing the dry gas into the pocket needles 10 are used. These are inserted through the plastic at a location as remote as possible from the needles 6, namely at the opposite end of the pane.

Referring to Fig. 3, air is withdrawn from the pocket between the panes by means of the pump 7 until the mercury 11 in the manometer registers a partial vacuum. Then a gas, preferably nitrogen, is introduced into the air pocket through the needles 10. It is drawn through the chamber 14 filled with any suitable dehydrating medium 15. The dehydrating medium is advantageously colored with a color indicator which changes color as the medium loses its dehydrating power. Valves are shown at 16 and 17. The nitrogen may be delivered from a storage cylinder under pressure. As the air is withdrawn through the needles 6 the nitrogen sweeps in from the needles 10 and fills the space between the panes. During this operation care is taken that the manometer always registers a slight vacuum so that at no time is the pressure in the air pocket greater than the pressure of the surrounding atmosphere. If the pressure were allowed to rise above atmospheric pressure, the gas in the pocket between the panes would force ts way out and break the seal between the panes and the spacer.

When all or substantially all of the air originally between the panes has been replaced by a dry gas the evacuation of the air is discontinued, and the introduction of dry gas is discontinued while the pressure in the pocket is less than that of the surrounding atmosphere, as measured by the manometer. Then the five needles are removed. As each is removed the minute hole which its removal leaves in the spacer is sealed by pressing a knife or other implement against the outer surface of the spacer.

The tape 4 is then sealed around the perimeter of the unit to insure the exclusion of moisture. If the unit is to be incorporated in some structure in which moisture will be excluded, the tape may be omitted. The tape may be stiff enough so that when pressed into position it remains permanently. Adhesive may be used on it but this is unnecessary.

The foregoing is illustrative. The use of a partial vacuum in the pocket between the panes in the finished unit is desirable to maintain a seal between the spacer and the panes, but this is not essential. The composition and apparatus may be modified without departing from the appended claims.

What I claim is:

1. A two-pane glazing unit, the panes of which are sealed to the balance of the unit at their edges by an airtight seal of uncured rubber composition to form a pocket, said composition containing at least about 10 parts by weight of petrolatum per 100 parts of the rubber, mineral filler in an amount greater than the amount of the rubber and a relatively small amount of tackifier.

2. A two-pane glazing unit, the panes of which are sealed to the balance of the unit at their edges by an airtight seal of uncured rubber composition to form a pocket, said composition containing substantially 100 parts of uncured rubber, 10 parts of petrolatum, 150 parts of whiting, and 5 parts of tackifier.

References Cited in the file of this patent

UNITED STATES PATENTS

| | | |
|---|---|---|
| 2,077,305 | Batchell | Apr. 13, 1937 |
| 2,150,355 | Biggers | Mar. 14, 1939 |
| 2,235,681 | Haven et al. | Mar. 18, 1941 |
| 2,273,733 | Paddock | Feb. 17, 1942 |
| 2,303,125 | Knight | Nov. 24, 1942 |